United States Patent [15] 3,693,917
Collec [45] Sept. 26, 1972

[54] PARACHUTES
[72] Inventor: Henri Collec, 92-Meudon-la-Foret, France
[73] Assignee: Aerazur Constructions Aeronautiques Societe Anomyme, Issy-les Moulineaux, France
[22] Filed: Aug. 12, 1970
[21] Appl. No.: 63,225

[30] Foreign Application Priority Data
Aug. 12, 1969 France..................6927750

[52] U.S. Cl...............................244/149
[51] Int. Cl. .................................B64d 17/68
[58] Field of Search............244/149, 145, 142, 147

[56] References Cited
UNITED STATES PATENTS

| | | | |
|---|---|---|---|
| 3,161,896 | 12/1964 | Holt et al. | 244/142 X |
| 2,196,947 | 4/1940 | Swofford | 244/142 |
| 3,087,697 | 4/1963 | Potts, Jr. | 244/149 |
| 3,152,782 | 10/1964 | Karpf | 244/145 |
| 3,234,503 | 2/1966 | Wojciechowski | 244/142 X |

*Primary Examiner*—Milton Buchler
*Assistant Examiner*—Carl A. Rutledge
*Attorney*—Sughrue, Rothwell, Mion, Zinn and Macpeak

[57] ABSTRACT

A container-stored parachute which comprises a tubular member consisting of a slightly porous material and a cable system to connect the extractor device with the canopy of the parachute, the tubular member and cable system constituting a protection device which, when inflated by air upon unfurling of the parachute, keeps away the extractor device so as to prevent it from damaging the canopy of the parachute.

7 Claims, 3 Drawing Figures

PATENTED SEP 26 1972   3,693,917
FIG.1
FIG.2
FIG.3
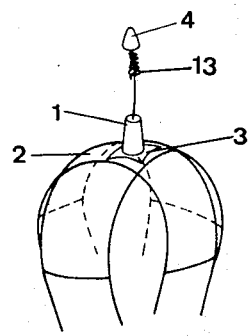
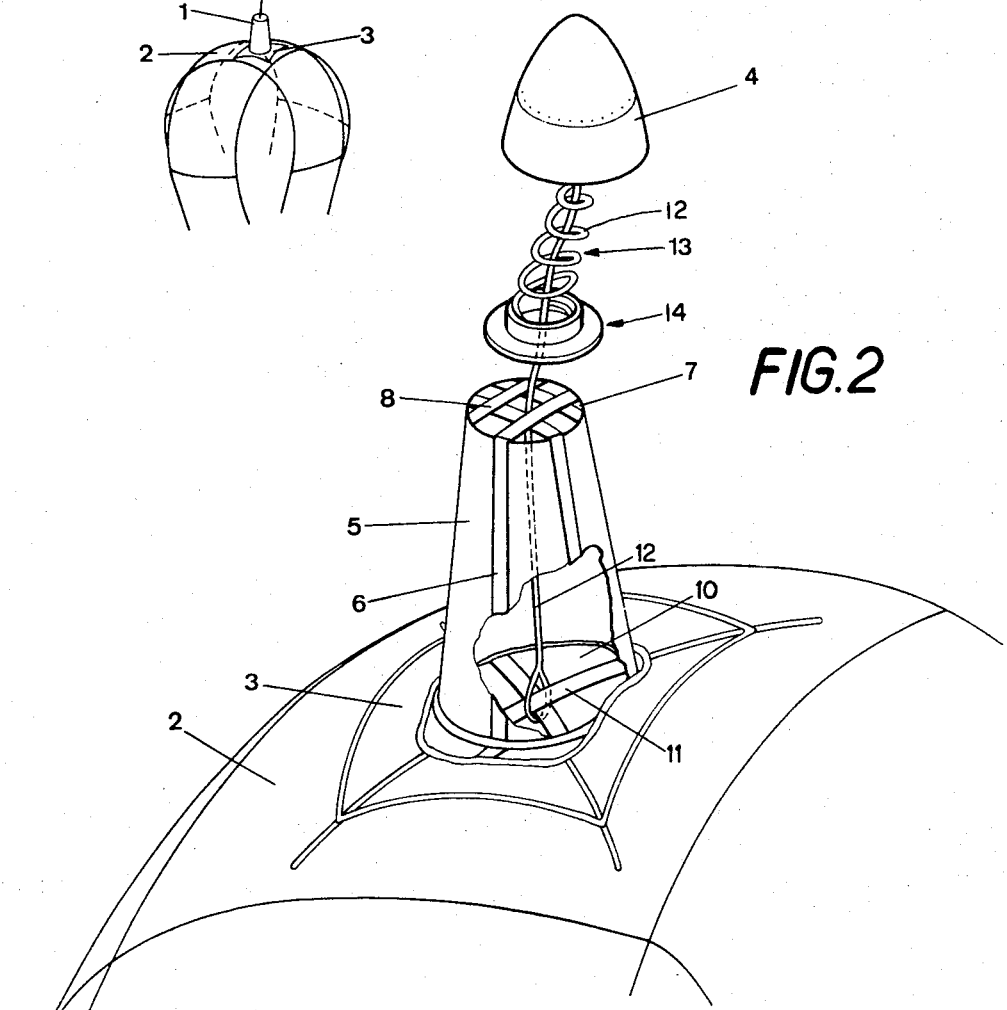
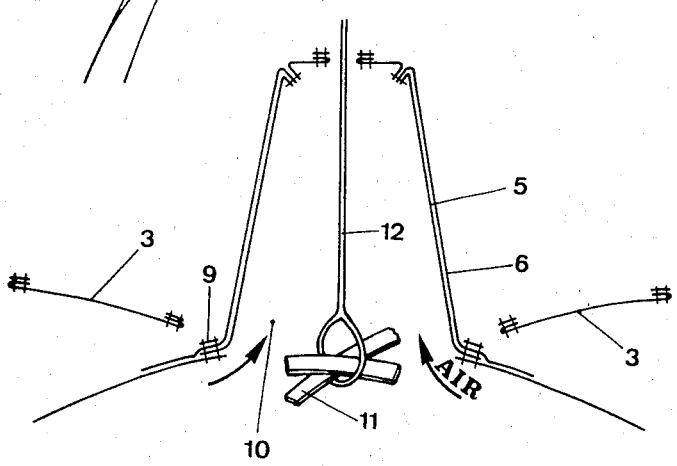

PARACHUTES

BACKGROUND AND SUMMARY OF THE INVENTION

The present invention relates to improvements in parachutes and more particularly to braking parachutes stored in containers.

It is currently known in the art to store braking parachutes in a container arranged in the back part of the vehicle to be stopped such as an aircraft. Those containers are obturated with a cover-extractor device well-known in the art which, when it is actuated, bursts away for releasing the parachute.

However, the existing devices have a disadvantage in that, when it bursts away, the cover-extractor device bangs behind the parachute and damages quite frequently the canopy of the parachute and more specifically the apex area thereof. In such a case the cover-extractor device rotates around an axis with a great radius and can cause great damage to the parachute and make the operation of the parachute defective or even inoperative.

The invention, therefore, has for one of its objects to remove this disadvantage and to provide a parachute which cannot be damaged by the coverextractor device. Another object of the invention is to provide means for ensuring a good positioning and a proper direction of the parachute with respect to the axis of the vehicle or the aircraft provided with such a parachute.

BRIEF DESCRIPTION OF DRAWINGS

These and other objects, features and advantages of the present invention will be disclosed more fully in the following specification based on the accompanying drawings in which:

FIG. 1 is a perspective view of a parachute provided with the protection device according to the invention;

FIG. 2 is an enlarged perspective view of the protection device according to the invention, showing the manner in which it is connected with the canopy of the parachute; and FIG. 3 is a cross-section view of the protection device according to the invention showing the details of its attachment to the canopy of the parachute.

DETAILED DESCRIPTION

In order to achieve its above mentioned objects, the invention proposes to provide parachutes with a protection device consisting of a tubular member of the wind-sail type and of a cable system positioned inside the tubular member in order to connect the canopy of the parachute to the cover-extractor system which is thus maintained in position at the top of the tubular member. The tubular member is preferably positioned on the top of the opening of the air-trap of the parachute. It will be understood that this tubular member may be fastened to the canopy of the parachute by any suitable means.

When the pilot of the aircraft has decided to release the parachute from the container he actuates the cover-extractor system. The parachute then unfurls and the air exhaust in the air-trap of the parachute inflates the tubular member. The cable system becomes tight and causes a fixation of the cover-extractor which is integral with the apex of the tubular member. In such a manner, the cover-extractor system cannot contact the canopy of the parachute which is thus protected, and the cover-extractor system is fixed and maintained in position so as not to bang.

It will be understood that reference is made in this specification to the usual cover-extractor system in use on most aircraft. It will be obvious, however, that the invention may be adapted to any type of extracting system. The embodiment shown in the drawings wherein the extracting system consisting of a device used at the same time for extracting the parachute and for closing the container should not limit the scope of the present invention.

In order to obtain best results, the invention provides for the tubular member to be made of a slightly porous material, preferably a heavy textile material. The invention provides more specifically that the tubular member should have a lower porosity with respect to the porosity of the material of the canopy of the parachute in order to obtain a proper stiffening of the tubular member in order to achieve the purposes of this invention. The slight porosity of the tubular member prevents the free exhaust of the air contained in the tubular member. The air exhaust out of the tubular member being more difficult or capable of being reduced, this air exhaust can be controlled according to the porosity degree. It will be apparent that this controlled porosity permits the tubular member of the wind-sail type to constitute a stiff point in the axial prolongation of the unfurling direction of the parachute.

This stiff point which is constituted by the tubular member allows the cover-extractor system of the container to be fixed. It also permits the tubular member to operate as a rudder axially and in a rectilinear manner in the direction opposed to the direction of the movement of the vehicle to be braked, to thus prevent the side bangings which take place presently upon the unfurling of the known braking parachutes. The tubular member of the wind-sail type permits the parachute to be stabilized and centered in order to ensure the maximum braking effect.

In FIG. 1, there is shown the protection device 1 which controls the extractor system 4. The extractor system 4 includes a spring 13 and a bas plate 14 to assist in the ejection of the canopy 2 from the container. In this embodiment, the protection device 1 has been positioned at the center and at the apex of the canopy 2 between the flaps 3 contributing to the extraction of the canopy of the parachute. In FIG. 2, there is shown in more detail the protection device 1 which comprises a tubular member 5 which may be cone-shaped. This tubular member 5 is reinforced by straps or bands 6. The tubular member 5 is closed on top with a cap 7 which may be reinforced by straps or bands 8.

With reference to FIG. 3, it will be seen that the tubular member 5 is fastened with the canopy of the parachute by stitching. Such a fastening is reinforced by a circular strap or band 9. An opening generally called trap 10 is arranged at the apex of the canopy of the parachute in order for the protection device to be fed with air. According to the invention, a cable system or the like is arranged inside the tubular member 5 in order to connect the canopy of the parachute to the extractor device in order to make the latter integral with the parachute. In the embodiment shown, this cable system consists of a strap 12 which is on one hand connected to the extractor system 4 and which is provided on the other hand with a buckle which is connected to the canopy of the parachute. This connection of the buckle with the canopy of the parachute may be as shown in the drawings. In the middle of the air-trap 10, there is positioned a cross-piece of straps or bands 11, the ends of which are fastened to the canopy of the parachute by stitching. This cross-piece permits the strap 12 to be hooked so as to make the extraction system integral with the canopy of the parachute.

The various straps or bands used may be made of any suitable material such as those known in the trade as Nylon or Polyamide 66.

It will be understood that the examples particularly described above are not intended to limit this invention. Various modifications of and additions to the arrangements described are possible without exceeding the scope of the invention. In particular the number of the various elements of the protection system and the position of this protection device could be changed without departing from the spirit of the invention defined in the appended claims.

I claim:

1. A container stored parachute comprising a canopy;
    extracting means for removing the canopy from the container to enable the canopy to become operatively inflated;
    a tubular member mounted on the canopy and open at both ends when the canopy is operatively inflated, the tubular member being relatively stiffer than the inflated canopy, and
    means for connecting the canopy with the extracting means, the connecting means extending through the tubular member and preventing the extracting means from contacting the inflated canopy of the parachute.

2. A container stored parachute as in claim 1, wherein axial longitudinal strips reinforce the tubular member.

3. A container stored parachute as in claim 2, wherein both openings of the tubular member are partially covered with cross strips.

4. A container stored parachute as in claim 3, where the means for connecting the extracting means is a line extending through the tubular member and connected to the cross strips at the entrance of the tubular member from the canopy.

5. A container stored parachute as in claim 4, where the extracting means includes a spring and base plate.

6. A container stored parachute as in claim 4, wherein the tubular member is less porous than the canopy.

7. A container stored parachute as in claim 4, wherein the tubular member is cone-shaped.

* * * * *